Nov. 8, 1949     P. F. HACKETHAL     2,487,127
PROPELLER CONSTRUCTION
Filed June 28, 1946
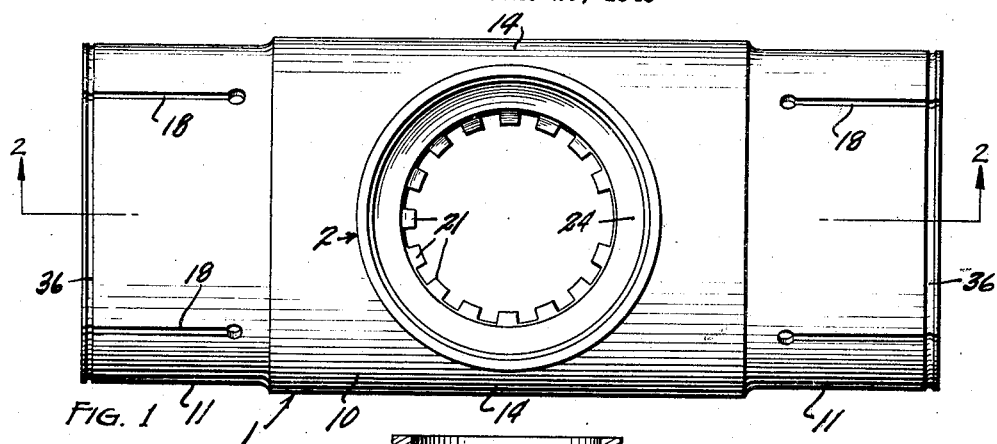
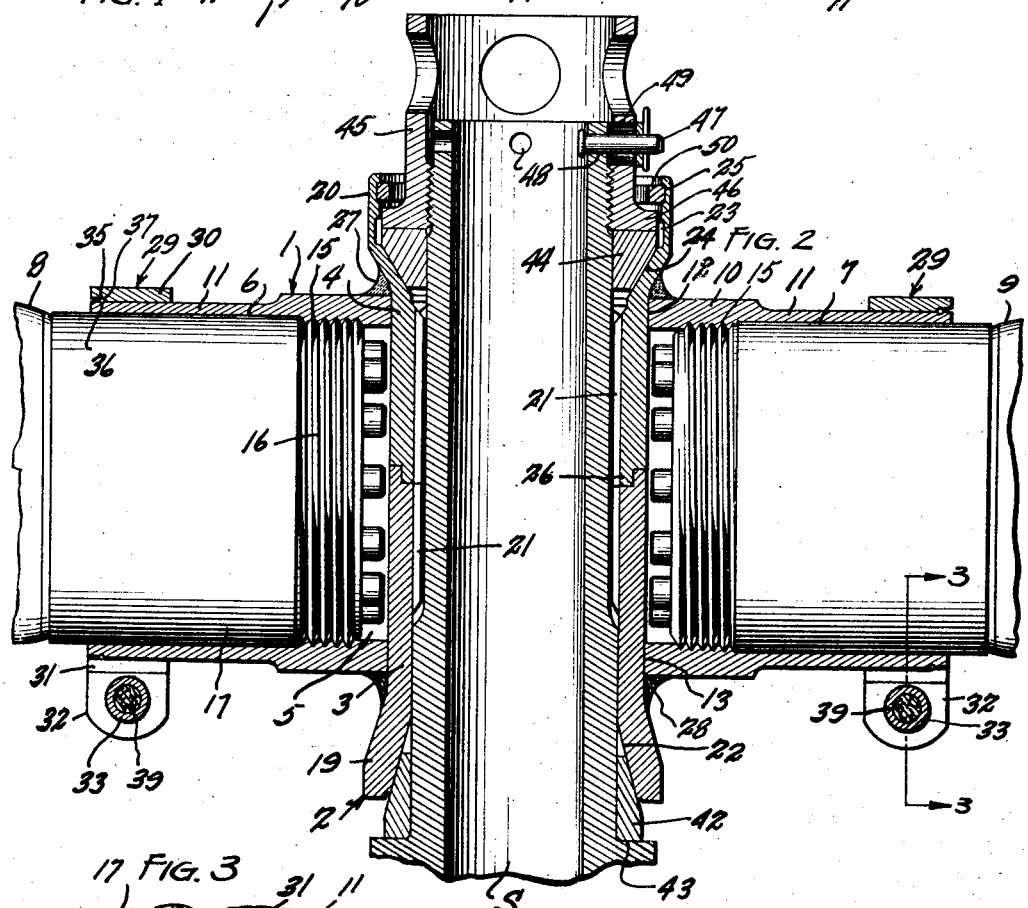
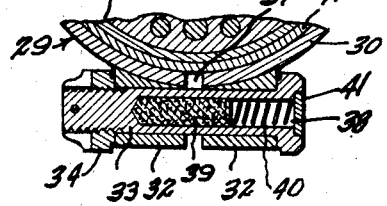
INVENTOR.
PAUL F. HACKETHAL
BY
Semmes, Keegin, Beale and Semmes
ATTORNEYS Patented Nov. 8, 1949

2,487,127

UNITED STATES PATENT OFFICE 2,487,127

PROPELLER CONSTRUCTION

Paul F. Hackethal, Cockeysville, Md., assignor to Koppers Company, Inc., doing business as Bartlett Hayward Division, Baltimore, Md., a corporation of Delaware Application June 28, 1946, Serial No. 680,270

7 Claims. (Cl. 170—160.6)

1

This invention relates to airplane propellers and more particularly to a built-up hub construction for small propellers of the so-called ground adjustable type.

Propeller hubs of the above type for two blade propellers, by way of example, consist essentially of a metal unit having a pair of diametrically opposed sockets in which the shanks of the propeller blades are adjustably mounted and a central propeller shaft receiving bore at right angles to and intersecting the axis of the sockets. The general practice followed in the manufacture of such propeller hubs is to machine the hub from a one-piece forging. This practice, however, has several disadvantages among which are the necessity of special and costly tool equipment, intricate and costly machining operations, and a great waste of metal. Furthermore, hubs so produced are heavy because of the practical impossibility of removing all metal not necessary for the strength of the hub, especially from the interior of the hub.

It has been proposed to make a hub in two pieces—one consisting of a tubular shell machined to receive the blade shanks and the other a one piece sleeve machined to fit the propeller shaft and its attaching means, the sleeve being inserted through a transverse bore in the shell and welded thereto.

The usual method of securing a propeller hub to its drive shaft is by splining the shaft into the cross bore of the hub and centering and clamping it therein by means of opposed, annular, conical wedges positioned on the shaft between a flange or shoulder thereon and a retaining nut on the end of the shaft, the cone wedges being drawn together into conical seats or flared ends of the cross bore. The retaining nut is likewise usually positioned in the cross bore. Obviously, to accommodate such structure, the shaft coupling sleeve in a built-up hub construction, such as above mentioned, must be of considerable diameter and, in order to leave sufficient shell metal in the region of the sleeve for safe strength, the shell must be of proportionately large diameter. As a consequence, the method of making hubs has heretofore been restricted to hubs for relatively large propeller blades.

According to this invention, I have provided a hub for relatively small propellers, particularly ground adjustable propellers, of a built-up construction, composed of a pre-machined, blade mounting shell and a pre-machined, shaft coupling barrel assembled therewith and joined thereto as an integral structure, the portion of the barrel passing through the shell being of sufficiently small diameter to provide safe strength to a shell of relatively small diameter. The portion of the barrel extending beyond the periphery of the shell is enlarged to receive the shaft centering cones and shaft attaching means. The hub

2 construction embodied in this invention incorporates simple and easily operated means for securing and clamping the blades in adjusted pitch positions therein and simple and easily adjusted means for balancing the propeller assembly.

In order to make the invention more clearly understood, a preferred embodiment thereof is shown in the accompanying drawings. It is to be understood, however, that the invention is not to be limited by the specific embodiment shown by way of illustration.

In the drawings:

Figure 1 is a front elevational view of a propeller hub constructed in accordance with this invention.

Figure 2 is a transverse sectional view taken along the line 2—2 of Figure 1, the shank portions of propeller blades being shown mounted in the hub and the hub attached to a propeller shaft.

Figure 3 is a fragmental cross sectional view taken on the line 3—3 of Figure 2.

The propeller hub, as shown in Figures 1 and 2, comprises a tubular blade mounting shell, designated generally as 1, and a tubular shaft coupling barrel, designated generally as 2 and composed of two axially aligned pieces 3 and 4 which, when assembled with the shell forms the complete hub. While the hub is especially adapted for small, ground adjustable propellers, the construction provides a strong, light-weight hub which is equally adaptable to other types of propellers employing detachable blades.

The shell 1 may be made from seamless steel tubing or bar stock and is machined with a cylindrical exterior and an axial bore 5 therethrough which provides axially aligned sockets 6 and 7 for the reception respectively of a pair of propeller blades 8 and 9. The diameter of the bore 5 is enlarged somewhat at opposite ends of the shell and the outside diameter is correspondingly reduced, as seen in Figure 2, to provide a thickened wall section 10 in the center portion of the shell for approximately half its length and a thinner wall section 11 for about one fourth the length of the shell back from each end. The shell is bored transversely in the thickened portion 10 intermediate the ends of the shell to provide diametrically opposed and equal apertures 12 and 13, the common axis of which intersects the axis of the bore 5. It is to be noted that the diameter of the apertures 12 and 13 is substantially less than that of the bore 5 and provides a substantial amount of metal in the shell wall between the apertures as indicated at 14 in Figure 1.

On opposite sides of the apertures 12 and 13, the bore 5 is provided with screw threads 15, in the thickened portion 10 of the shell wall, which are adapted to engage corresponding screw threads 16 on the extremities of cylindrical shank portions 17 of the blades 8 and 9. The thinner wall end portions 11 are made flexibly constrictable by means of a series of radial slits 13 which, as seen in Figure 1, extend longitudinally from opposite ends of the shell toward the center approximately to the thickened wall portion 10.

Each of the component parts 3 and 4 of the shaft coupling barrel 2 may likewise be machined from seamless steel tubing or bar stock with their inner portions (as assembled in the hub), turned to the diameter of the apertures 12 and 13 and their outer end portions, which will lie beyond the periphery of the shell, in the assembled hub, circumferentially enlarged as indicated respectively at 19 and 20. Both of the parts 3 and 4 are bored axially therethrough to fit a propeller shaft S and, adjacent their inner ends, are provided with matching, longitudinal, internal splines 21 which are adapted to mate with corresponding external splines adjacent the end of the propeller shaft.

The axial bore in the enlarged outer end 19 of the barrel part 3 is flared outwardly to form a conical seat 22, while the enlarged outer end 20 of the barrel part 4 is internally bored cylindrically a short distance back from the end, as shown at 23, and then tapered inwardly toward the smaller diameter of the axial bore to form a conical seat 24. An internal peripheral groove 25 is formed in the enlarged end 20 adjacent its outer extremity. The outer surfaces of the enlarged ends of the parts 3 and 4 are preferably tapered inwardly to the smaller portions, following generally the tapers of the conical seats 22 and 24.

In assembling the hub, the two halves 3 and 4 of the shaft coupling barrel are inserted respectively into the apertures 12 and 13, in axial alignment with each other and with the splines 21 aligned. Preferably the inner extremities of the parts 3 and 4 are interengaged such as by spigoting them together, as indicated at 26, with a press fit to assure concentricitiy of the parts. After so assembling the barrel parts are welded to the shell as shown at 27 and 28, which securely unites the parts into a strong integral hub which is completely machined needing only heat treatment, if required, and external finishing such as removal of tool marks and plating if desired.

In assembling, the propeller blades 8 and 9 are screwed into their respective sockets 6 and 7 as described above and adjusted therein to desired pitch angles. They are then clamped against rotational displacement by constricting the split end portions 11 into tight frictional engagement with the shanks 17 of the blades. For this purpose, and to provide a simple means for balancing the propeller, clamp rings 29 are provided about the opposite extremities of the shell as seen in Figures 2 and 3.

The clamp rings 29 each comprise a band 30 which is bored to the outside diameter of the reduced end 11 of the shell and slit radially, as indicated at 31 in Figure 3. Adjacent the slit 31, the opposite ends of the band have respectively secured thereto, blocks or ears 32 each of which is drilled to provide aligned apertures for the reception of a headed clamping bolt 33 fitted with a nut 34 to draw the ends of the ring together and constrict the split end of the shell. Outward axial displacement of the rings 29 may be prevented by a snap ring 35, fitting in a groove 36 near the end of the shell, and engaging an internal shoulder 37 formed in the ring 29 as seen in Figure 2.

As seen in Figure 3 the bolt 33 is drilled axially from the head end thereof to provide a blind bore 38 into which is packed weighting material 39 such as lead wool. Preferably a compression spring 40 is positioned in the bore 38 between the weighting material and a plug or cap 41 at the open end of the bore 38 to prevent displacement of the material therein.

In balancing the propeller assembly the weighted ring assemblies 29 are utilized to bring the propeller into balance both about the axis of rotation of the propeller, which may be termed horizontal balance, and also about the axis of the blades, which may be termed vertical balance. To accomplish this, the propeller is set up in a balancing fixture to freely rotate about its rotational axis or the axis of the shaft 20. More or less of the weighting material is then inserted in the bores 38 of the bolts 33 on both sides of the rotational axis of the propeller until it is perfectly balanced. The spring 40 and retaining plugs 41 are then inserted and the propeller is mounted for rotation about the axis of the blades. The rings 29 are then rotationally adjusted about the blade axis which shifts the weighted bolts 33 until the blade is brought into balance about this axis. The nuts 34 are then tightened and the propeller is ready for installation on the propeller shaft of an airplane.

The means of attaching the propeller to a drive shaft S is conventional as seen in Figure 2. The splined end of the shaft with an inner centering cone 42, in place thereon against a shoulder 43 on the shaft, is inserted into the bore of the cross barrel 2, engaging the splines 21 therein, until the cone 42 is seated in the seat 22. The outer centering cone 44 is then slipped on the shaft and seated in its conical seat 24. An annular nut 45 having an externally flanged end 46 is threaded on to the end of the shaft S and drawn up tightly thereon which draws the cones 42 and 44 together into their conical seats centering the cross barrel 2 on the shaft. A pin 47 or other restraining means may then be inserted through one of several apertures 48 in the end of the shaft S and a registering slot 49 in the nut to prevent loosening of the nut. To provide aid in removing the hub from the shaft a snap ring 50 may be fitted in the groove 25 to engage the flange 45 on the nut so that when the nut is unscrewed it will draw the cross tube 2 relatively with respect to the shaft sufficiently to loosen the cone wedges 41 and 43.

To adjust the pitch of the propeller blades in use, it is only necessary to loosen the clamping rings 29 and rotate the blades to desired pitch and then retighten the rings.

I claim:

1. A hub for aircraft propellers comprising a cylindrical blade receiving shell having an axial bore therethrough and a substantially thin wall, said wall having diametrically opposed and axially aligned circular apertures of substantially smaller diameter than said bore and normal thereto, shaft coupling barrel means comprising two axially aligned tubular members respectively inserted in said apertures, the inner end of one member engaging the inner end of the other member, the outer end of each member being larger in diameter than the inserted portions thereof and lying wholly outside said shell, and fused joints between said elements and wall rigidly uniting the barrel means and shell.

2. A hub for aircraft propellers comprising a cylindrical blade receiving shell having an axial bore therethrough and a substantially thin wall, said wall having diametrically opposed and axially aligned circular apertures of substantially smaller diameter than said bore and normal thereto, shaft coupling barrel means comprising two axially aligned tubular members respectively inserted in said apertures, the inner end of one member being spigoted into the inner end of the other member, the outer end of each member being larger in diameter than the inserted portions thereof and lying wholly outside said shell, and fused joints between said elements and wall rigidly uniting the barrel means and shell.

3. A hub for aircraft propellers comprising a cylindrical blade receiving shell having an axial bore therethrough and a substantially thin wall, said wall having diametrically opposed and axially aligned circular apertures of substantially smaller diameter than said bore and normal thereto, shaft coupling barrel means comprising two axially aligned tubular members respectively inserted in said apertures, the inner end of one member engaging the inner end of the other member, the outer end of each member being larger in diameter than the inserted portions thereof and lying wholly outside said shell, the outer end of each member being internally flared to form conical seats therein adapted to cooperate with centering cones for the shaft, said seats lying wholly within the enlarged ends of said members, and fused joints between said elements and wall rigidly uniting the barrel means and shell.

4. In an adjustable pitch aircraft propeller a cylindrical shell having an axial bore therethrough and a substantially thin wall, said wall having diametrically opposed and axially aligned circular apertures therein intermediate the ends of said shell and normal to the axis thereof, shaft coupling barrel means comprising two axially aligned tubular members respectively inserted in said apertures, the inner end of one member engaging the inner end of the other member, the outer end of each member being larger in diameter than the inserted portions thereof and lying wholly outside said shell, and fused joints between said elements and wall rigidly uniting the barrel means and shell, a propeller blade having a shank rotatably positioned in each end of said axial bore, means cooperating between the blade shanks and shell wall inhibiting axial displacement of the blades from said shell and clamping means cooperating with said shell inhibiting rotational displacement of the blades in said shell.

5. In an adjustable pitch aircraft propeller a cylindrical shell having an axial bore therethrough and a substantially thin wall, said wall having diametrically opposed and axially aligned circular apertures therein intermediate the ends of said shell and normal to the axis thereof, shaft coupling barrel means comprising two axially aligned tubular members respectively inserted in said apertures, the inner end of one member engaging the inner end of the other member, the outer end of each member being larger in diameter than the inserted portions thereof and lying wholly outside said shell, fused joints between said elements and wall rigidly uniting the barrel means and shell, a propeller blade having a shank rotatably positioned in each end of said axial bores, means cooperating between the blade shanks and shell wall inhibiting axial displacement of the blades from said shell, said shell wall being axially slitted adjacent opposite ends thereof, and constrictable clamping means about said slitted ends constricting the same in engagement with said blades for inhibiting rotational displacement of the blades in the shell.

6. In an adjustable pitch aircraft propeller a cylindrical shell having an axial bore therethrough and a substantially thin wall, said wall having diametrically opposed and axially aligned circular apertures therein intermediate the ends of said shell and normal to the axis thereof, shaft coupling barrel means comprising two axially aligned tubular members respectively inserted in said apertures, the inner end of one member engaging the inner end of the other member, the outer end of each member being larger in diameter than the inserted portions thereof and lying wholly outside said shell, fused joints between said elements and wall rigidly uniting the barrel means and shell, a propeller blade having a shank screw threaded into each end of said bore, said shell wall being axially slitted adjacent opposite ends thereof, and constrictable clamping means about said slitted ends constricting the same into engagement with the blade shanks for inhibiting rotational displacement of the blades in the shell.

7. A hub for aircraft propellers comprising a cylindrical blade receiving shell having an axial bore therethrough and a substantially thin wall, said wall having diametrically opposed and axially aligned circular apertures of substantially smaller diameter than said bore and normal thereto, shaft coupling barrel means comprising two axially aligned tubular members respectively inserted in said apertures, the inner end of one member engaging the inner end of the other member, the outer end of each member being larger in diameter than the inserted portions thereof and lying wholly outside said shell, fused joints between said elements and wall rigidly uniting the barrel means and shell, the wall thickness at opposite ends of said shell being reduced, said reduced ends being each provided with a plurality of longitudinal slits, a propeller blade having a screw threaded shank inserted in each end of said bore and having a screw threaded engagement with the thicker portion of the shell wall, and constrictable clamping means positioned about each reduced end of said shell for constricting the same into engagement with the blade shanks to inhibit rotational displacement of said blades in the shell.

PAUL F. HACKETHAL.

REFERENCES CITED

The following references are of record in the file of this patent:

UNITED STATES PATENTS

| Number | Name | Date |
|---|---|---|
| 1,509,804 | Dicks | Sept. 23, 1924 |
| 1,608,754 | McCauley | Nov. 30, 1926 |
| 1,608,755 | McCauley et al. | Nov. 30, 1926 |
| 1,769,775 | Dicks | July 1, 1930 |
| 1,801,486 | Caldwell | Apr. 21, 1931 |
| 1,829,437 | Clay | Oct. 27, 1931 |
| 1,865,170 | Carter | June 28, 1932 |
| 1,947,073 | Wilson | Feb. 13, 1934 |
| 1,995,312 | Larason | Mar. 26, 1935 |
| 2,101,149 | Martin | Dec. 7, 1937 |
| 2,317,629 | McCauley | Apr. 27, 1943 |
| 2,347,282 | Roby | Apr. 25, 1944 |
| 2,378,842 | Forsyth | June 19, 1945 |
| 2,420,424 | Hackethal | May 13, 1947 |